I. GEFTER.
PERCOLATING COFFEE POT.
APPLICATION FILED DEC. 15, 1913.
1,109,918.
Patented Sept. 8, 1914.
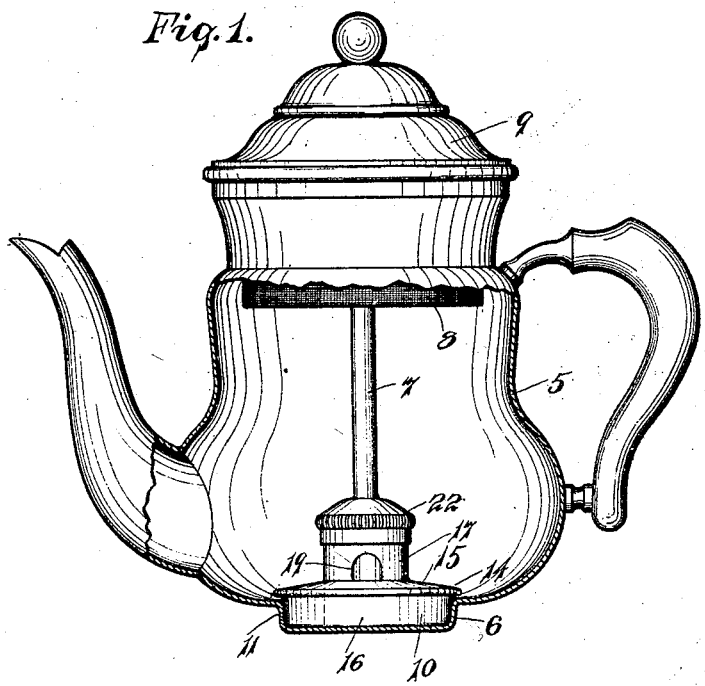
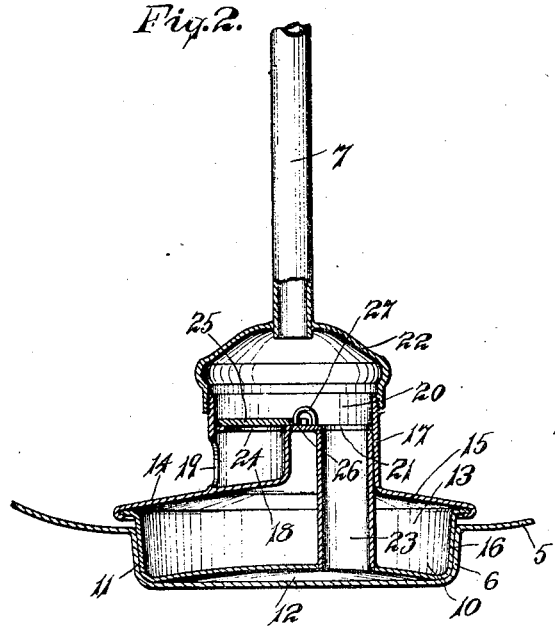
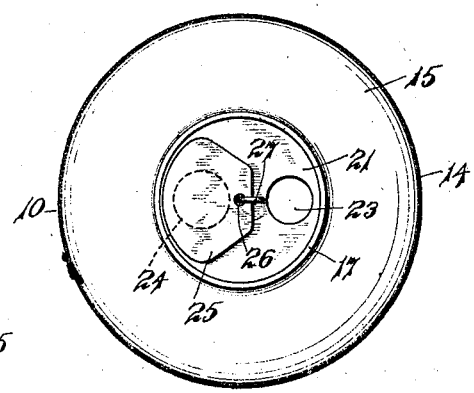
WITNESSES:
INVENTOR.
Israel Gefter
BY
Arthur B. Jenkins
ATTORNEY.

UNITED STATES PATENT OFFICE.

ISRAEL GEFTER, OF MERIDEN, CONNECTICUT.

PERCOLATING COFFEE-POT.

1,109,918.  Specification of Letters Patent.  Patented Sept. 8, 1914.

Application filed December 15, 1913. Serial No. 806,667.

*To all whom it may concern:*

Be it known that I, ISRAEL GEFTER, a citizen of the United States, and a resident of Meriden, in the county of New Haven and State of Connecticut, have invented a new and Improved Percolating Coffee-Pot, of which the following is a specification.

My invention relates to the class of devices employed more especially in the preparation of coffee as a beverage, and embodying means for causing the liquid to percolate through the coffee above the liquid in the pot, and an object of my invention, among others, is to provide a device of this class in which the action shall be particularly quick and effective.

One form of device embodying my invention and in the construction and use of which the objects herein set out, as well as others, may be attained, is illustrated in the accompanying drawings, in which—

Figure 1 is a side view, partially in central vertical section, of a coffee pot embodying my invention. Fig. 2 is a detail view on enlarged scale partially in central section through the fountain showing its construction. Fig. 3 is a detail top view of the fountain with the cap removed.

In the accompanying drawing the numeral 5 denotes a coffee pot, that may be composed of any suitable material and that may be of any desired shape. This pot has a depression 6 at the bottom thereof forming a recess within which the fountain is located, a fountain tube 7 projecting upwardly from the fountain to deliver the liquid from the pot on to a body of coffee located in a basket 8 supported in any suitable manner within the pot, the latter being closed as by a cover 9. All of the parts above mentioned, with the exception of the fountain, may be of any well known construction and further and detailed description is therefore omitted herein.

The fountain 10 is preferably of a form to fit the recess 11 in the depression 6, and it is constructed to provide a heating chamber 12 at the bottom of the recess 11. As herein shown the outer surface of the bottom of the fountain is made concave to form the heating chamber, the interior of the fountain having an insulating chamber 13 located within the base 14. This base may be formed in any suitable manner, as herein shown, a cap 15 being secured to the top of the dish shaped body 16. A neck 17 rises from the base of the fountain and in that neck an inlet chamber 18 is formed at one side thereof having an inlet opening 19. A valve chamber 20 is also formed in the neck 17 above a diaphragm 21 extending across the neck, in the preferred form of construction, a cap 22 closing the top of the neck and constituting a part of the valve chamber 20. A passage 23 extends from the heating chamber 12 into the valve chamber 20 and a valve opening 24 leads from the inlet chamber 18 into the valve chamber 20. A valve 25 is pivotally mounted to control the opening 24, in the preferred form of construction, and as shown herein, this valve being pivoted at a single point, at which point it has a hole 26 to receive one branch of a U-shaped pivot 27 secured and projecting from the upper surface of the diaphragm 21. The fountain tube 7 is secured in any suitable manner to the cap 22.

In the operation of the device, heat being applied to the bottom of the pot, the liquid within the heating chamber 12 is quickly heated to a point to provide sufficient pressure to force the liquid upward through the passage 23, the valve chamber 20 and the tube 7 at the upper end of which it is discharged. This pressure closes the valve 25 against its seat, and as soon as the pressure is relieved the valve 25 rises and allows the liquid to enter the inlet opening 19, the inlet chamber 18, and passing through the valve opening 24 into the chamber 20 it flows through the passage 23 to the heating chamber 12 where the action is repeated. The construction is so simple as compared with percolators in common use that it may be made at a comparatively low cost, and yet the operation is more effective than that of some expensive and complicated structures. The arrangement of the pivot is such that the valve may readily respond to pressure at any point, and it is extremely sensitive for this reason.

While I have shown and described herein a preferred form of device for carrying out my purpose, this may be changed to a greater or lesser degree and yet embody the invention, and I do not therefore limit the invention to a device made in exact accordance with that herein shown and described.

I claim—

1. A percolator including a vessel, a device constructed to form the top of a heating chamber at the bottom of the vessel, a neck rising from the top of said device and having a closed top, a fountain tube opening into the neck, a diaphragm extending across the neck, a valve chamber above said diaphragm and an inlet chamber below it, the said diaphragm having a valve opening and an opening to a passage to the heating chamber, said neck having an opening in its side wall to said inlet chamber, and a valve pivotally mounted on said diaphragm to control flow through the valve opening.

2. A percolator including a vessel, a device formed to provide a heating chamber at the bottom of the vessel, said device having a neck rising therefrom, a cap removably secured to the neck to close the top thereof, a fountain tube rising from said cap, a diaphragm extending across the neck and constituting a boundary of a valve chamber above and an inlet chamber below said diaphragm, the said diaphragm having a valve opening and an opening to a passage communicating with the heating chamber, said neck having an opening through its side wall communicating with the inlet chamber, and a valve pivotally mounted upon said diaphragm to control flow through the valve opening.

3. A percolator including a vessel, a fountain located in the bottom of the vessel and constructed to form the top of a heating chamber at the bottom of the vessel, said fountain having an insulating chamber, a neck rising from the top of the insulating chamber, said neck being closed at its top, a fountain tube rising from the top of the neck, a diaphragm extending across the neck forming a boundary of a valve chamber above and an inlet chamber below said diaphragm, the said diaphragm having a valve opening and an opening to a passage extending through the fountain to the heating chamber, said neck also having an opening to said inlet chamber, and a valve pivotally mounted on said diaphragm to control flow through said valve opening.

4. A percolator including a vessel, a fountain constructed to form the top of a heating chamber at the bottom of the vessel, said fountain having a top forming one wall of an insulating chamber, a neck rising from said top, a cap removably secured to the neck and forming the top of a valve chamber within the neck, a fountain tube rising from said cap, a tube extending through said fountain and forming a passage between the heating chamber and said valve chamber, a diaphragm extending across the neck and dividing its interior into said valve chamber and into a lower inlet chamber, the said diaphragm having an opening to the inlet chamber, and an opening to said passage, and a valve pivotally mounted on said diaphragm to control flow through the opening to the inlet chamber, said neck having an opening through its side wall to said inlet chamber.

5. A percolator including a vessel, a fountain constructed to form the top of a heating chamber at the bottom of the vessel, said fountain having a top forming one wall of an insulating chamber within the fountain, a neck projecting upwardly from the top of said fountain and closed at its upper end, a fountain tube rising from said neck, a diaphragm extending across the neck between its top and bottom, and dividing the neck into a valve chamber above and an inlet chamber below said diaphragm, said diaphragm having a valve opening and an opening to a passage through the insulating chamber to the heating chamber, said neck having an opening through its side wall to the inlet chamber, and a valve pivotally mounted on said diaphragm to control flow through said valve opening.

ISRAEL GEFTER.

Witnesses:
H. FRAMK,
S. FRAYHTLIN.